United States Patent Office 2,880,197
Patented Mar. 31, 1959

2,880,197
POLYOXAMIDES

Denis Coleman, Manchester, England, assignor to Imperial Chemical Industries Limited, London, England, a corporation of Great Britain No Drawing. Application February 3, 1956
Serial No. 563,178

Claims priority, application Great Britain
February 9, 1955

4 Claims. (Cl. 260—78)

This invention relates to improvements in or relating to polyamides.

In specification No. 473,470 there are described new synthetic polyamides characterized in that the dicarboxylic acid used in the manufacture thereof is oxalic acid and the diamine component is a mono- or di-methyl substituted hexamethylene diamine wherein the methyl groups are in the 2, 3, 4 or 5 positions. These new polyamides contain the repeating unit:

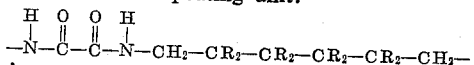

wherein any one or two of the R's stand for methyl groups and the other R's stand for hydrogen.

We have now found that the properties of these new polyamides can be improved by copolymerization with high molecular weight polyethers so as to introduce into the polymer chain linkages of the general formula

wherein $m$ is a number greater than 20.

Thus according to the present invention we provide the improvement in or modification of the invention of specification No. 473,470 which comprises copolymerizing the polyamide-forming ingredients of specification No. 473,470 with high molecular weight polyethers so as to introduce into the polymer chain linkages of the general formula

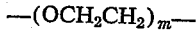

where $m$ is a number greater than 20.

The high molecular weight polyethers used in the present invention are the polyethylene oxides, preferably having end-groups consisting of a carboxylic acid or ester or an amino group. Such end-group modified polyethylene oxides may be prepared by oxidation of polyoxyethylene glycols by means of 60% nitric acid containing a copper/ammonium vanadate catalyst to give the polyoxyethylene-α:ω-dicarboxylic acids, or by treatment of the glycols with thionyl chloride followed by ammonia to give the α:ω-diamines.

The introduction of the —(OCH₂CH₂)$_m$ linkages into the polyamides of specification No. 473,470, containing the repeating unit

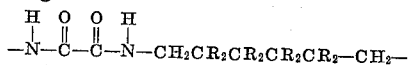

may be achieved by adding the high molecular weight polyether to the starting materials of specification No. 473,470 and then performing the polymerization in the manner described in specification No. 473,470. Most conveniently the polyether is added to the diamine and the mixture is allowed to react with the alkyl or aryl ester of oxalic acid.

The amount of polyether added to the polyamide-forming ingredients is preferably from 5% to 25% of the total weight of the co-polymer.

The new polyamides of this invention possess substantially all of the desirable properties of the polyamides of specification No. 473,470 and in addition they possess greatly reduced tendency to accumulate an electrostatic charge; also they can be dyed with acid dyestuffs.

The invention is illustrated but not limited by the following examples in which parts are by weight.

*Example 1*

7 parts of polyoxyethylene-α:ω-dicarboxylic acid of molecular weight 1300 are added to 67 parts of 3-methyl-hexamethylene diamine in 70 parts of methanol. The solution is then mixed with 73 parts of diethyl oxalate and the mixture is heated to 285° C. for 4 hours at 0.5 mm. pressure. The melt on cooling is a hard, crystalline solid having a Vicat softening point of 240° C. Using conventional melt-spinning equipment the copolymer gives fibres having the following properties:

Tenacity _____ 2.7 g./den.
Extensibility _____ 15.8%.
Dyeability _____ 0.6% (using the acid dyestuff Naphthalene Scarlet 4RS).
Dynamic work recovery__ 84.0% (at an extension of 0.5%).

The polyoxyethylene-α:ω-dicarboxylic acid used in this example was prepared as follows:

100 parts of polyoxyethylene glycol 1540 was added to 200 parts of 60% nitric acid containing 0.70 part of copper and 0.30 part of ammonium metavanadate as catalyst at 85° C. over 30 minutes with stirring. The substance was stirred for a further hour at this temperature and the nitric acid then removed by evaporation under reduced pressure on the steam-bath. The residue was then dissolved in methanol, treated with 10 parts of decolorizing carbon (Darco G60) and filtered. The carbon treatment was repeated and the almost colourless methanolic solution evaporated to dryness, and the solid residue recrystallized from benzene/ether to give a colourless wax which by titration with sodium hydroxide had a molecular weight of 1300.

*Example 2*

The process of Example 1 is repeated using 14 parts of polyoxyethylene-α:ω-dicarboxylic acid of molecular weight 1300 instead of 7 parts; fibres are obtained having the following properties:

Tenacity _____gm./den__ 2.4
Extensibility _____percent__ 15.0

Electrostatic properties: There is a complete absence of static charge generated on running the yarn over a polished steel peg, whereas a charge of 10,000μμ coulomb/metre accumulates on yarn spun from the unmodified polyamides and a charge of 20,000μμ coulomb/metre on nylon yarn.

Dyeability _____ 1.2% (using the acid dyestuff Naphthalene Scarlet 4RS).

Light stability of the dyeing—3 on the Society of Dyers and Colourists scale of 1-8 (i.e. similar to the light stability of the same dyeing on nylon 66 yarn).

With a disperse dye, namely Dispersol Fast Scarlet BL50, the light fastness of the dyeing on the modified fibre is better than on nylon 66 yarn (5 on the S.D.C. scale of 1-8, compared with 2-3 for the same dyeing on nylon 66 yarn).

Percent
Dynamic work recovery_____ 76.0
Initial modulus_____ 28.6
Elastic recovery:
    From 1% extension_____ 91.2
    From 4% extension_____ 60.3
Work recovery:
    From 1% extension_____ 80.6
    From 4% extension_____ 39.6

Example 3

The process of Example 1 is repeated using 23 parts of polyoxyethylene α:ω-dicarboxylic acid of molecular weight 2740 (to give a copolymer containing 20% of the polyether).

Fibres are obtained having the following properties:

| | |
|---|---|
| Tenacity _____gm./denier__ | 3.0 |
| Extensibility _____percent__ | 11.1 |

Daylight tests: Exposed to daylight for six months the fibres lost 27% of their tenacity. An unmodified polyoxamide fibre lost 50% and a nylon 66 fibre lost 83%.

Dyeability: The saturation dye uptake of the acid dye Naphthalene Scarlet 4RS was 1.6%. An unmodified fibre showed no affinity for the dyeing. The stability of the dyeing to daylight was 4 on the S.D.C. scale compared with a value of 3 for the same dye on nylon.

On repeating the above process using 28 parts of the polyoxyethylene-α:ω-dicarboxylic acid the fibres obtained had very poor physical properties, and when 35 parts were used no fibres could be obtained.

Example 4

The process of Example 2 was repeated using a 1:3 mixture of 2- and 3-methylhexamethylene diamines instead of 3-methylhexamethylene diamine. Fibres are obtained having the following properties:

| | |
|---|---|
| Tenacity _____gm./denier__ | 3.1 |
| Extensibility _____percent__ | 15.0 |

Resistance to light: Exposed to daylight for 6 months the fibres lost 35% of their tenacity whilst an unmodified polyoxamide lost 54% and a bright nylon control lost 83%. The corresponding falls in the extensibilities of the fibres at break were 41, 73 and 78%.

Hydrolytic stability: After immersion for 30 minutes in boiling 10% hydrochloric acid or in 10% sodium hydroxide the fibres were merely relaxed, the same change in tenacity and extensibility being observed when the fibres were immersed in boiling water. A nylon control behaved similarly in sodium hydroxide or in water alone but disintegrated in the acid.

When the above process was repeated using 3 parts of the polyether instead of 14 parts, the fibres picked up a detectable amount of static electricity. Furthermore, the dyeability (0.2%) of these fibres was poor with acid dyes.

What I claim is:

1. The process for preparing a high molecular weight, fiber-forming copolymer which comprises copolymerizing a dicarboxylic component selected from the group consisting of oxalic acid and amide forming derivatives thereof; an amine component selected from the group consisting of mono- and di-methyl substituted hexamethylene diamines wherein the methyl groups are in the 2–5 positions and from 5% to 25%, based on the total weight of copolymer, of a high molecular weight polyethylene oxide having at least twenty —($OCH_2CH_2$)— groups and end groups selected from the class consisting of carboxy groups and —$NH_2$ groups, said copolymerization being carried out by heating said components together in the absence of oxygen and with the removal of water until said high molecular weight, fiber-forming polymer is obtained.

2. The process of claim 1 wherein said polyethylene oxide is first mixed with said diamine and the resulting mixture is reacted with an oxalic acid derivative selected from the alkyl and aryl esters of oxalic acid.

3. A high molecular weight, fiber-forming copolymer obtained by condensation reaction between a dicarboxylic component selected from the group consisting of oxalic acid and amide forming derivatives thereof; an amine component selected from the group consisting of the mono- and di-methyl substituted hexamethylene diamines wherein the methyl groups are in the 2–5 positions; and from 5% to 25%, based on the total weight of copolymer, of a high molecular weight polyethylene oxide having at least twenty —($OCH_2CH_2$)— groups, and end groups selected from the class consisting of carboxy groups and —$NH_2$ groups.

4. A high molecular weight, fiber-forming copolymer according to claim 3 wherein said dicarboxylic component is diethyl oxalate and said amine component is 3-methyl-hexamethylene diamine.

References Cited in the file of this patent

UNITED STATES PATENTS

| | | |
|---|---|---|
| 2,190,770 | Carothers | Feb. 20, 1940 |
| 2,299,839 | McQueen | Oct. 27, 1942 |
| 2,360,673 | Hanford | Oct. 17, 1944 |
| 2,558,031 | Allen et al. | June 26, 1951 |
| 2,659,754 | Ash et al. | Nov. 17, 1953 |
| 2,692,873 | Langerak et al. | Oct. 26, 1954 |